March 9, 1965  R. McFEE  3,173,079
SUPERCONDUCTING ELECTRICAL DEVICES
Filed Jan. 23, 1959  3 Sheets-Sheet 1

INVENTOR.
RICHARD McFEE
BY
Kenyon & Kenyon
ATTORNEYS

March 9, 1965  R. McFEE  3,173,079

SUPERCONDUCTING ELECTRICAL DEVICES

Filed Jan. 23, 1959  3 Sheets-Sheet 2

INVENTOR.
RICHARD McFEE
BY
Tenyon & Tenyon
ATTORNEYS

March 9, 1965  R. McFEE  3,173,079
SUPERCONDUCTING ELECTRICAL DEVICES
Filed Jan. 23, 1959  3 Sheets-Sheet 3
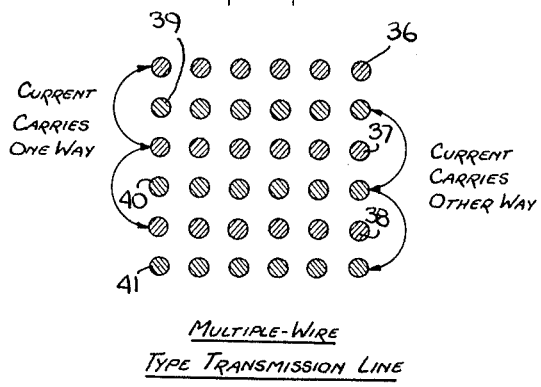
Fig. 16.
Multiple-Wire Type Transmission Line
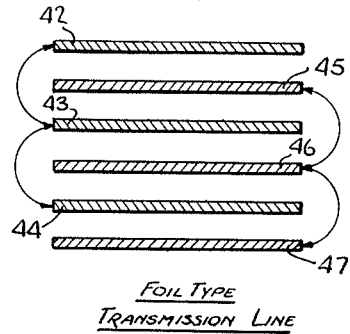
Fig. 17.
Foil Type Transmission Line
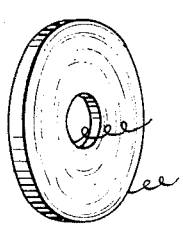
Oblique View
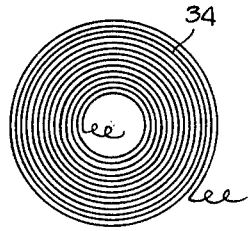
Side View
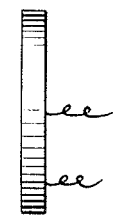
Front View
Fig. 14.
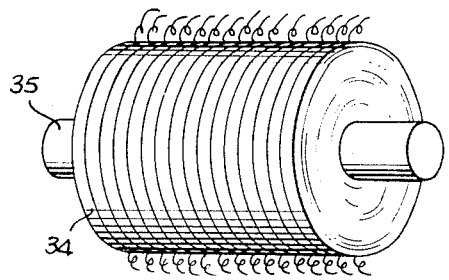
Fig. 15.
INVENTOR.
RICHARD McFEE
BY
Kenyon & Kenyon
ATTORNEYS United States Patent Office 3,173,079
Patented Mar. 9, 1965

3,173,079
SUPERCONDUCTING ELECTRICAL DEVICES
Richard McFee, R.D. 2, Jamesville, N.Y.
Filed Jan. 23, 1959, Ser. No. 788,591
16 Claims. (Cl. 323—44)

The present invention relates generally to superconductive electrical devices, and more particularly to a transformer of high efficiency formed by superconductive windings maintained at extremely low temperatures.

Conventional power transformers consist of two or more coils wound about a laminated iron core, the coils being magnetically coupled by the core such that an alternating voltage applied to one coil induces a voltage in another coil. Among the factors which impair the efficiency of a transformer are hystereses and eddy current losses as well as coil losses. In operation, the rise in temperature of a transformer is caused by iron losses in the core and copper losses in the winding conductors. There is also some heat generated by reason of dielectric loss in the insulation.

The heat dissipated by a transformer represents a power loss, and even where the transformer efficiency is very high a heat loss of a few tenths of a percent may constitute a considerable drawback. For example, a modern three hundred thousand kilowatt transformer, such as is used in power generating stations for power distribution, when operating at 99.8% efficiency and full load will burn up sixty thousand dollars worth of electricity per year, assuming a charge rate of one cent per kilowatt hour. This represents the best now attainable. Less efficient transformers will burn up even more power.

In order to minimize heat losses in heavy duty transformers, it is essential that winding conductors of large gauge be used in conjunction with massive iron cores. Thus transformers employed at power stations usually weigh several tons and are of enormous size. Moreover, such transformers are very costly.

In view of the foregoing, it is the principal object of the invention to provide a superconducting transformer of small size and high efficiency, the transformer being relatively inexpensive.

More particularly, it is an object of this invention to provide a transformer incorporating superconducting windings in which current is conducted without heat dissipation, the transformer being of relatively small size as compared to a standard transformer of the same current-carrying capacity.

Yet another object of the invention is to provide a method and means for intermingling the windings of a superconducting transformer so as to reduce the formation of deleterious magnetic fields, whereby superconductivity is maintained at high current densities.

Also an object of the invention is to provide improved refrigeration systems for a superconducting transformer in which the power consumption for the system is minimized. A significant feature of the invention resides in the use of a multi-stage refrigeration system.

It is a further object of the invention to provide a superconductive power transmission line.

For a better understanding of the invention as well as other objects and further features thereof, reference is had to the following detailed description to be read in conjunction with the accompanying drawings, wherein like components in the various views are identified by like reference numerals.

In the drawings:

FIG. 6 shows the intermeshing relationship of the transformer coils.

FIG. 14 shows three views of a spiral wound coil unit for another embodiment of a transformer in accordance with the invention.

FIG. 15 is a perspective view of the spiral unit transformer.

FIG. 16 is a sectional view of a multiple wire superconductive transmission line.

FIG. 17 is a sectional view of a multiple foil transmission line.

*General principles*

Figure 1:
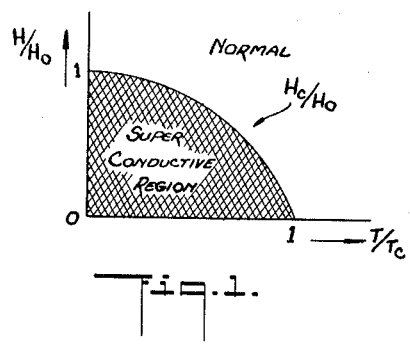
FIG. 1 is a graph showing the relationship between temperature and the magnetic field around a superconductor.

Before describing the structure of a transformer in accordance with the invention, we shall briefly consider the phenomenon of superconductivity in order that the properties of superconductive metals be clearly understood.

A significant property of metals, as contrasted to nonmetals, is their relatively large electrical conductivity. It is known that current is conveyed by the motion of electrons driven through the crystal lattice of the metal by the applied voltage. The electrons collide with the atoms in the lattice and this impedance to their motion constitutes the electrical resistance of the metal. In general, the resistance increases as the temperature rises, for the atoms in the lattice then oscillate over wider distances from their lattice positions and interfere with the electron movement to a greater extent. Conversely, as the temperature falls, the conductivity increases.

An ideally pure metal at absolute zero ($-273°$ C.$=0°$ Kelvin) will have infinite conductivity. However, actual metals contain imperfections and its conductivity will rise only to a finite value. There nevertheless exists a class of metals which in spite of impurities, grain boundaries and other defects exhibits infinite conductivity or superconductivity below some finite transition temperature. The resistance at superconductivity is not merely extremely low, it is exactly zero.

At the transition temperature, which is a few degrees above absolute zero, there occurs a thermodynamic transition into the superconducting state, this transition temperature being different for different superconductive metals. Thus, the transition temperature, in the absence of a magnetic field, is 3.7 degrees K. for tin, 7.3 degrees K. for lead and 8 degrees K. for niobium.

If the relationship between magnetic field strength and temperature of a superconductor is examined, it will be seen that when the temperature of the material is maintained at a value below the transition temperature at zero magnetic strength, its resistance can be shifted back and forth between some finite value (the normal resistance of the metal) and zero simply by the application and removal of a small magnetic field. A change in magnetic field can be effected by a current flow in the material itself or by induction.

While superconductive transformers have been theoretically proposed, it has not heretofore been possible to construct a transformer of practical value. As pointed out above, if the magnetic field about a superconductor becomes too strong, the superconductivity vanishes and normal resistance is restored. When, therefore, transformers are wound in an ordinary manner, each turn of wire is influenced not only by its own magnetic field but also by the field of all the other turns. The overall field will be excessive and will render the transformer non-superconductive, as a result of which it will be unable to handle as much power for its size as a standard transformer operating at room temperature. Furthermore, its efficiency will be low, due to the relatively large amount of heat conducted in by the input leads, which must be removed by refrigerator consuming power.

This phenomenon can be best understood by reference to FIG. 1 showing the relationship between magnetic field strength and temperature in a superconductor. The cross-hatched region in the lower left portion of the area in the graph represents combinations of magnetic field strength and temperature for which the material is superconductive. The area outside the cross-hatched region indicates conditions under which the material displays ordinary electrical resistance.

The symbol T in the horizontal axis represents absolute temperature and symbol $T_c$ the zero field critical temperature. Symbol H in the vertical axis refers to magnetic field strength, $H_0$ being the critical magnetic field at zero temperature. The curve $H_c/H_0$ represents the magnetic field strength at the point of transition. The shape of the curve for any superconductive material is generally as indicated in FIG. 1, but the intercepts at the axes are characteristic for each material. Thus the problem involved in superconductive transformers is the maintenance of superconductivity under magnetic field conditions tending to destroy superconductivity.

*The basic superconductive transformer structure*

In accordance with the present invention, this difficulty is overcome by so arranging and intermingling the primary and secondary windings of the transformer as to minimize those magnetic field effects which would render the conductors non-superconductive.

The invention is based on the fact that in a transformer a flow of current in the secondary will always be counteracted by an oppositely directed and proportional flow of current in the primary, the net effect of which is to avoid any change in the magnetic field in the transformer laminations.

Expressed more exactly, the magnetomotive force due to current flow in the secondary is balanced out by an equal and opposite magnetomotive force from the primary. "Ampere-turns" in the secondary are bucked by equal and opposite "ampere-turns" in the primary. All this is in addition to the very slight flow of magnetizing current in the primary which generates the alternating magnetic field responsible for the back E.M.F. in the primary and the voltage of the secondary.

Figure 2:
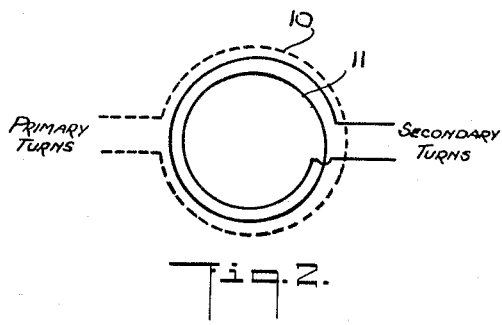
FIG. 2 is a schematic showing of the coil windings in a transformer in accordance with the invention.

Let us first postulate that we have a transformer adapted to step up 1,000 volts of alternating current at 100 amperes to 2,000 volts at 50 amperes. If, as shown in FIG. 2, each turn of the primary winding 10 is wound together with two turns of the secondary 11, the resultant configuration will have 100 primary amperes going, say, clockwise and 2×50=100 amperes of the secondary going in the opposite direction, i.e., counterclockwise. Thus the combination of turns will have zero effective current in it and its resultant magnetic field will also be zero. If now the transformer is wound with combined turns as herein described, they will not produce magnetic fields which influence each other and the wires may carry much larger currents without loss of superconductive properties.

Figure 3:
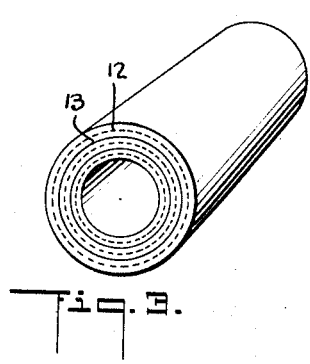
FIG. 3 is a perspective view of the transformer coil.
Figure 4:
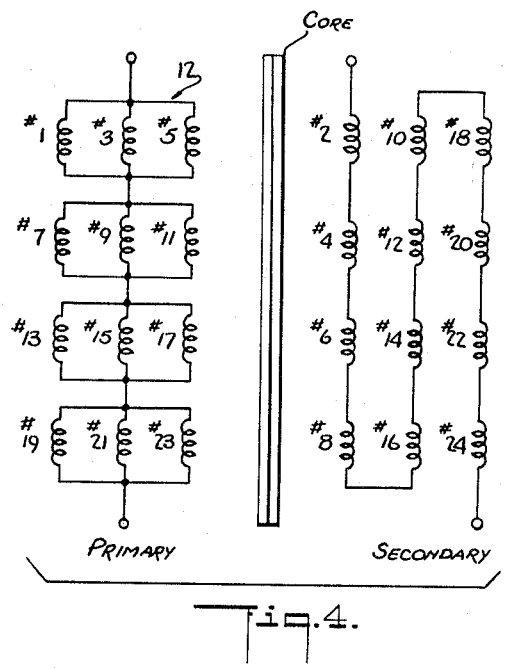
FIG. 4 is a schematic diagram of the primary and secondary coil connections.

The simplest and most effective winding technique for obtaining the desired cancellation of magnetic fields is illustrated in FIGS. 3 and 4. Let us assume that it is desired to build a superconductive transformer having a three to one step-up ratio, the primary to be a low voltage-high current coil and the secondary to be a high voltage-low current coil.

In accordance with the invention, the primary windings 12 and secondary windings 13, as shown in FIG. 3, are wound in alternate helical or barrel layers so that the structure is composed of concentric cylindrical helices in which the primary and secondary coils are interleaved. The same gauge of wire is used both for the primary and secondary windings. In the example shown there are twelve coiled layers of primary and an equal number of secondary layers.

In order to obtain the desired 3:1 ratio, the secondary layers are serially connected as shown in FIG. 4, whereas the primary layers are connected in series-parallel relation, the primary layers being constituted by four series-connected groups of layers, each group containing three layers in shunt relation. The numbers on the coils refer to the layers, with #1 on the innermost coil and #2 on the outermost coil.

Figure 5:
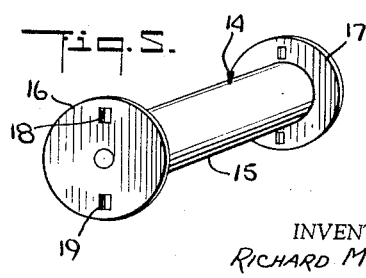
FIG. 5 is a perspective view of the spool on which the coils are wound.

The layers are preferably wound about a spool 14, as shown in FIG. 5, constituted by a tubular hub 15 to whose ends are attached end caps 16 and 17 having diametrically opposed slots 18 and 19 cut therein. The spool 14 is fabricated of laminated phenolic plastic or other material which is structurally stable at extremely low temperatures.

In winding the layers on the spool, the first will be a primary layer, the second a secondary, the third a primary, the fourth a secondary, etc. The wires of the respective layers are preferably intermeshed as shown in FIG. 6.

The wires from adjacent layers enter via slots on the end cap, all of the primary wires exiting from slot 18 and all of the secondary wires from slot 19. This arrangement assures symmetry between primary and secondary layers while at the same time permitting them to be wound one on top of the other in an interleaved manner.

It is also possible to connect the various layers in a variety of series-parallel arrangements so that any desired ratio of operation is obtained. For example, if six primary and six secondary layers are provided, by connecting the six primaries in parallel and the six secondaries in series, a 1:6 step-up ratio may be obtained, and by paralleling all primaries and all secondaries a 1:1 ratio is produced.

The transformer core construction may be of the so-called core type or shell type formed by laminations of steel or other alloy so processed as to secure the desirable qualities of high permeability and low core loss at the flux densities at which it will be operated. To prevent magnetic flux from escaping, the laminations are preferably made of magnetic material having a low reluctance such as "mu-metal."

Figure 7:
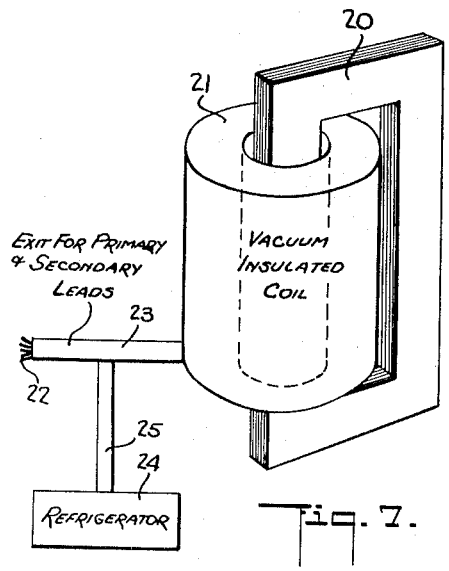
FIG. 7 is a perspective view of the transformer structure according to the invention in conjunction with a refrigeration system.

In FIG. 7 the transformer coil is wound about one leg of a rectangular core 20 and is hermetically sheathed in a vacuum jacket 21. The purpose of the jacket is to facilitate refrigeration at the extremely low temperature called for in maintaining superconductivity.

The leads 22 going to the primary and secondary coils pass through a hollow guide 23 communicating with the vacuum jacket 21, the refrigerator system 24 being operatively coupled to the jacket through a stub guide 25 extending laterally from guide 23. The incoming leads are made of a metal such as copper having the highest possible ratio of electrical to thermal conductivity.

It will be noted that core 20 is outside the refrigeration region and is exposed to ambient temperature. This arrangement has distinct advantages. First, the heat generated by hysteresis and eddy current effects in the magnetic material does not warm up the coils and does not, therefore, have to be extracted by the refrigeration system. This, of course, substantially reduces the load imposed on the system. Second, the resistance of the laminations is high and eddy currents are small. This keeps the effective reluctance of the magnetic circuit low and minimizes leakage of magnetic flux.

Figure 8:
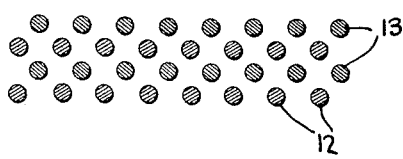
FIG. 8 is a preferred embodiment of a transformer of the shell type.
Figure 8:
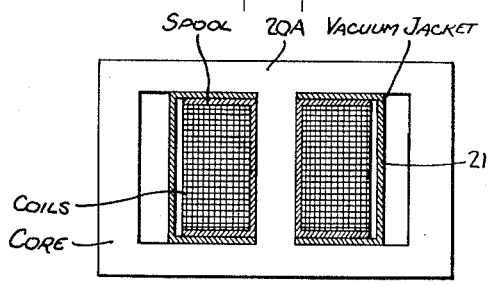

In FIG. 8 a core 20A of the shell type is shown, the transformer coils being mounted on the center leg and being enclosed in the vacuum jacket. This arrangement, save of the core construction, is identical with that shown in FIG. 7.

Transformer design

The choice of the number of turns and the magnetic circuit may be based on standard equations for transformer design. The induced voltage per turn is $$\frac{d\phi}{dt}$$

where the core flux $\phi$ is in webers. Most transformers operate at a peak core flux density of about one weber per square meter.

The design of a step-down transformer is determined as follows:

(1) Given the desired current rating of the primary, calculate the minimum wire size required on the basis of data on the "critical current" of super conductors. The critical current depends on the temperature, the material and the wire diameter. Useful data in this regard is given in the text "Solid State Physics" by Kittel.

(2) Select a suitable configuration for the magnetic circuit. In practical transformers the magnetic core will be kept at room temperature, and only the winding need be cooled to avoid the extra cooling effort required to remove the heat generated by hysteresis and eddy current losses.

(3) Using the desired voltage rating of the transformer, and assuming that half the winding space is devoted to the primary, determine the size of the core such that product of the rate of change of core flux times the number of turns is equal to this voltage.

(4) Choose a series-parallel arrangement for the secondary such that the desired step-down ratio is obtained. Reverse the transformer connections to obtain a step-up ratio.

The following is an example of the transformer design. Suppose the transformer is a have a primary operating at 10,000 volts of 60 cycle alternating current and 1,000 amperes (10,000 kva.) and the secondary is to operate at 5,000 volts and 2,000 amperes. According to Kittel, the critical current of a single wire of lead (Pb), .35 inch in diameter, at 4.2° K. is about 1,000 R.M.S. amperes; thus it is adequate to carry the primary current.

Figure 9:
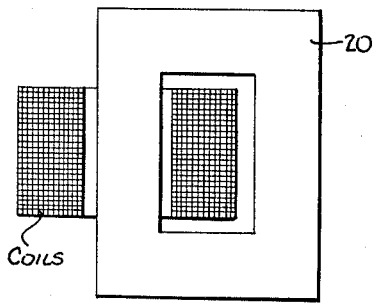
FIG. 9 is a sectional view of the transformer shown in FIG. 7.

The core configuration, which is shown in FIG. 9 with a peak flux density of one weber per square meter, a core cross-section of .054 sq. meters, and 680 primary turns occupying a winding cross-section of .054 square meters, gives a total voltage of 14,000 peak volts, or 10,000 R.M.S. volts, as required. All the primary layers are in series, while the secondary is broken up into two paralleled windings, each with 340 turns. We have assumed here an insulation strength of 100 volts per .001 inch, which requires that each wire have insulation 1/20 of an inch thick.

It is advantageous to have the transformer operate at as high a temperature above 0° Kelvin as possible, for the refrigeration effort decreases roughly in inverse relation to temperature. Thus if the transformer can be operated, say, at 8° K. rather than 4° K., and the critical current is the same in both instances, the refrigeration effort will be halved. This fact is to be borne in mind in the choice of wire and for this reason niobium may be preferred to lead.

The calculations given above give the maximum possible wire size, but a smaller size may be used in practice. In general, the current-carrying capacity varies directly with diameter. This means that two wires of half the diameter of another can carry the same total current. But they have roughly half the cross-sectional area. This signifies that if the process of subdivision is continued and infinitely fine wires are used, the transformer can in theory be made infinitely small. But this cannot be done in practice, for the primary and secondary wires, being adjacent, must be insulated from each other and this factor must be taken into account in determining transformer size. It is important that the insulation used be effective at the extremely low temperatures. One material suitable as insulation is Teflon.

The vacuum jacket

Figure 10:
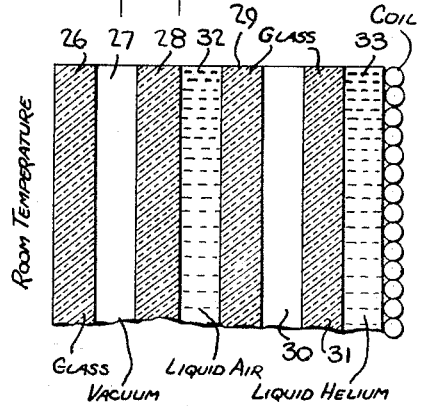
FIG. 10 is a sectional view of the vacuum jacket for the transformer coils.

The vacuum jacket 21 preferably is in the form of a double Dewar vessel, as partially shown sectionally in FIG. 10. The exterior Dewar is constituted by an outer glass wall 26 separated by a vacuum space 27 from an inner glass wall 28. The interior Dewar is constituted by an outer glass wall 29 separated by a vacuum space 30 from the inner glass wall 31. The middle space between walls 28 and 29 is filled with liquid nitrogen 32 and the space between the innermost wall 31 and the transformer coils is filled with liquid helium 33 to maintain the coils in the superconductive region. The walls in the vacuum spaces 27 and 30 are silvered to minimize radiation.

The Dewar is shaped essentially like a doughnut or toroid with the transformer coil enclosed therein. In practice, the coil is wound first and the Dewar then assembled about the coil. This can be done, for example, by slitting four glass tubes which are turned around on themselves and spliced into continuous loops. All loops will have the same mean diameter but increasingly larger sizes so that they can nest one within the other. These loops are assembled about the wound coil and the glass edges fused together. The Dewar can also be made of metal rather than glass.

It will be appreciated that many other insulating arrangements may be used to maintain the necessary superconductive temperatures.

Transformer efficiency

There are two factors that determine the transformer efficiency, namely, refrigeration effort and core losses. The refrigeration effort depends upon the amount of heat that leaks into the cold region, or is generated there, and the work needed to extract it. Heat enters via the input leads, as well as through the walls of the vacuum jacket which insulates the cold region. We have assumed that the heat generated is zero, since the wires are superconducting. (This neglects the power lost in the insulating dielectric.) The heat that flows in through the input wire depends on the size of the wire and is the main factor. We have found that if the input wire is copper and its size is adjusted so that the heat flow is minimum, the heat input per lead will be .042 I watt, where I is the R.M.S. current. Input leads of other materials such as nickel or aluminum may be slightly superior, giving a heat flow perhaps 10% lower than this value, but copper appears to be the best all-round choice since it is easily obtained in a variety of wire sizes.

The transformer, described previously, will have a total heat influx of 2×1000×.042 plus 2×2000×.042 watts, or 250 watts. The heat influx through the jacket walls will be negligible. (Liquid helium will last up to six weeks in a double Dewar, before it evaporates.) The refrigeration effort required to remove this heat Q introduced by the leads can easily be calculated for an ideal Carnot refrigerator. It is $$\left(\frac{T_2}{T_1}-1\right)Q$$

where $T_1$ is the temperature of the coils, $T_2$ is the temperature of the exterior region and the temperatures are in degrees Kelvin. (Room temperature 290° K.) Thus the minimum refrigeration effort for the transformer described is $$\left(\frac{290}{4.2}-1\right)(250)$$

or 17,000 watts. At a feasible refrigeration efficiency of 50% this would become 34,000 watts. This is .34% of the power handled by the device.

The second factor determining efficiency is the core loss which consists of eddy current and hysteresis loss. Both of these losses are proportional to the transformer core volume, and hence will be considerably smaller for a superconducting transformer than for a regular transformer, since the former is much smaller. Since the core volume is small, it becomes economical to use very thin laminations, which will reduce the eddy current losses to a negligible amount, leaving only the hysteresis losses. For the transformer design given earlier, the core volume is about .13 cubic meter. Since hysteresis loss at 60 cycles and 1 weber peak is about $\frac{1}{50}$ watt per cubic centimeter, the total core loss is 2,630 watts.

Thus the total efficiency of the transformer is determined by a core loss of 2,630 watts and a refrigeration effort of 34,000 watts, which compare with a transformer power handling capability of 10,000,000 watts, i.e., the losses are .35% of the power handled, the efficiency is 99.65%.

The losses will be lower if the voltage ratings are increased, because the currents will then be smaller, smaller leads can be used and less heat will flow. The losses can also be greatly reduced by multiple-stage cooling of input leads, as is disclosed in the next section.

Figure 11:
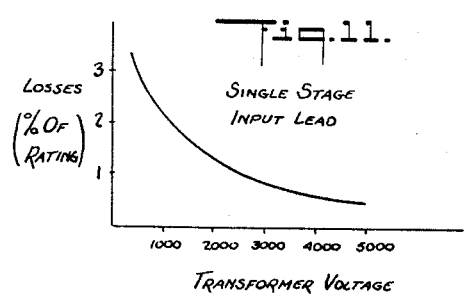
FIG. 11 is a graph showing the relationship between transformer voltage and losses.

FIG. 11 is a graph presenting a rough estimate of efficiency vs. voltage rating for a single-stage refrigeration of the input lead based on the assumption that the secondary has ten times the voltage of the primary. Note that the efficiency drops as the voltage drops and it is not economical to build transformers with rating below about 500 volts on the windings, since the efficiency there drops below 98%, which is about what can be achieved in good transformer design, unless multi-stage refrigeration of the input leads is used in reducing the refrigerator's effort, as disclosed in the next section.

Figure 12:
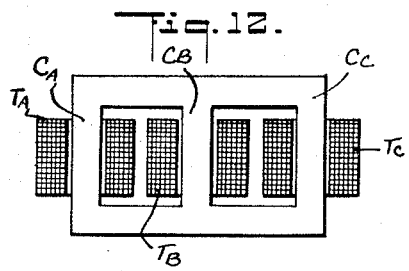
FIG. 12 is a sketch showing a three-phase transformer structure according to the invention.

Power transformers are usually three-phase rather than single-phase. Three-phase transformers using the shared magnetic paths indicated in FIG. 12 have lower core losses than single-phase transformers. It will be seen that coil $T_A$, $T_B$ and $T_C$ are magnetically intercoupled by core loops $C_A$, $C_B$ and $C_C$. They also have smaller amounts of heat conducted into the coils, and the refrigeration effort will be less. The losses will be decreased by about 40%.

Reducing the refrigeration effort

The refrigeration effort calculated above is based on the assumption that the lead proceeded from room temperature to nearly absolute zero in one abrupt jump. If the passage is made in several steps, the refrigeration effort can be reduced by an order of magnitude, and the voltage rating of economical superconducting transformers reduced by the same factor. This reduction is due mainly to the fact that copper wire at low temperatures has very little resistance, and consequently fine wires can carry heavy currents, with little dissipation or conduction of heat.

Figure 13:
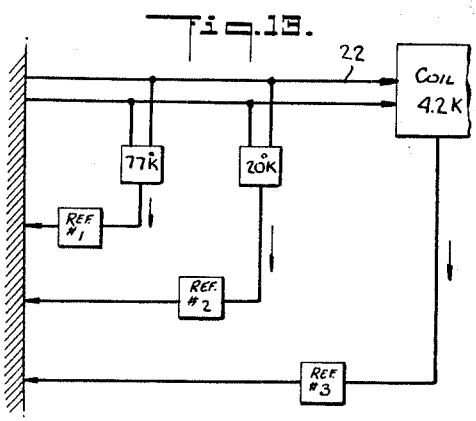
FIG. 13 is a multi-stage refrigeration system for the transformer.

If, as shown in FIG. 13, the copper wire leads 22 for the transformer proceeds from room temperature to the temperature of liquid nitrogen (77° K.) as provided by refrigeration system R #1, then to the temperature of liquid hydrogen (20° K.), as provided by refrigeration system R #2, and finally to the temperature of liquid helium (4.2° K.), as provided by refrigeration system R #3. Calculations indicate that the refrigeration effort required would be only one-sixth as much as it would be if the jump were made in one step. Thus the transformer previously described as having an efficiency of 99.65% can be operated at an efficiency of 99.96% with multiple-stage cooling.

Spiral and foil windings for superconducting transformers

The interleaved windings specifically disclosed above are of the "layer" type, wherein a primary layer is first wound, a secondary layer being then placed on top of the primary layer, another layer placed on top of it, and so forth. There are two other specific techniques by which the same result may be obtained.

In FIGS. 14 and 15 a spiral-wound multiple coil transformer arrangement is shown. Each spiral unit as shown in FIG. 14 consists of an annular spiral forming in effect a single layer of the superconductive transformer. In the transformer as shown in FIG. 15 a stacked assembly is formed of the individual spirals mounted on a common magnetic core 35. One series of alternate spiral units in the assembly constitute the primary winding of the transformer, and the remaining units form the secondary. By selected series and parallel connection of the units forming the primary and secondary, in the manner previously described, the desired transformer ratio may be obtained. An advantage of the spiral arrangement is that there are a greater number of coils and there is, as a result, more flexibility in the possible choice of voltage ratios.

Rather than conductors in the form of wires of circular or rectangular cross-section, foil windings may be used. The spiralled construction used with foil may be similar to that incorporated in capacitors with metal foil or a metallized insulating web. The transformer can be constructed with one or more of these foil windings, and the primary and secondary windings can be connected in series or parallel as desired.

Laminated superconducting transmission line

Circuits designed for transmitting relatively large amounts of power from one fixed point to another are called transmission lines, and those for delivering small amounts at numerous points are designated distribution circuits.

In order to keep losses from exceeding 4–5% of the power handled, sixty cycle transmission lines use very high voltages to reduce the currents in the lines and thus minimize the $I^2R$ losses in the conductors. A line voltage of about 1,000 volts per mile is common practice to long distance lines. An upper limit on these voltages of about 500 kilovolts is imposed by corona loss due to ionization of air molecules at the surface of the conductor. These very high voltages require high towers, expensive right-of-ways, costly insulators and switch gear, and special terminating transformers.

As an alternative means of transmitting power, the present invention provides a transmission line constructed out of superconducting materials maintained at a low temperature. Such a line becomes competitive with existing lines if the wires are inter-leaved in the manner disclosed herein.

The use of superconductors for power transmission is advantageous for the following reasons. (a) The resistance of the conductor is zero, hence the $I^2R$ losses are zero. (b) Low voltage operation is feasible and expensive towers, right-of-ways, insulators, switchgear, etc., are avoided. It is also possible for current to be sent directly from the alternators out onto the line, without requiring terminating transformers.

In order for superconducting transmission lines to be of practical value, it is necessary that they be able to handle very large powers. The reason for this is that the power needed to refrigerate, let us say, 50 to 500 miles of transmission line, will be quite substantial, even with very good insulation used to prevent the seepage of heat into the line. For the line to be economically feasible it must transmit so much power that the refrigerator effort becomes a very small part of the total. This cannot be done using an ordinary pair of wires as a superconducting line. A one inch wire made of lead (Pb) and operated at 4.2° K. can carry roughly 3000 amperes before it exceeds the critical field where superconduction stops. Such a line if operated at ten kilovolts could carry only 30,000 kilowatts. This capacity is inadequate.

The current-carrying capacity of the line can be greatly increased, without substantially changing the voltage rating, by breaking up each of the two wires into a number of smaller wires. The current-carrying capacity of an "ideal" superconducting wire is roughly proportional to its diameter. Thus ten wires each of $\frac{1}{10}$ cm. diameter can carry the same current as one wire of 1 cm. diameter. Since their total cross-section is much less, a larger number of wires can be used in the same cross-section, and the current which can be carried in the area of the original cross-section is increased.

However, this will happen only if the magnetic fields of the wires are not permitted to influence one another, since the fields arising outside the wires as well as the fields generated by the wires themselves can cause the superconducting quality of the wire to vanish. In order for a superconducting transmission line to be practically feasible, it is necessary that the arrangement be such that the magnetic fields of the multiple conductors carrying the current are prevented from influencing one another. This is accomplished in FIG. 16 in a multiple wire type line wherein the multiple wire arrays 36, 37 and 38 carry current in one direction and the interposed wire arrays 39, 40 and 41 carry current in the opposed direction. A like result is obtained in the foil construction shown in FIG. 17 in which foils 42, 43 and 44 carry current in one direction and foils 45, 46 and 47 in the other. Thus magnetic fields are prevented from reaching one another by interleaving the conductors carrying current one way with conductors carrying current the other way.

Consider two of these conductors, one carrying the current one way, the second the other way, when they are placed side by side. The external field of both of these conductors taken together will be almost zero, since the currents are oppositely directed. A transmission line made up of a number of dual conductors of this type will, therefore, not be troubled by the magnetic fields of one of them influencing the superconductivity of the others.

The capacity and efficiency of such a transmission line may be estimated as follows. Suppose that the line is composed of lead wires each $\frac{1}{10}$ inch in diameter. These wires can carry a peak current of about 300 amperes before superconduction ceases. If they are operated at a peak voltage of 10,000 volts, and are insulated with a material having a strength of approximately 100 volts per .001 inch, each wire will need $\frac{1}{20}$ of an inch of insulation, giving it a total diameter of $\frac{1}{5}$ of an inch. Four hundred such wires will occupy a cross-section of about 4 inches, with 200 carrying current one way, 200 the other. Thus the current-carrying capacity will be $200 \times 300$ or 60,000 amperes at 10,000 volts. This is 600,000 kw., enough power for the peak load of a city of half a million people.

The efficiency of the transmission line will be determined primarily by two factors, (a) the leakage of heat into the line through the insulating walls enclosing it, (b) the leakage of heat into the line through the conductors at the ends of the line. It is assumed that the line is enclosed in a very good insulator, such as a double Dewar, where there are two evacuated spaces and a center region containing a cold fluid such as liquid nitrogen. The line itself is maintained at a temperature near absolute zero, such as the temperature of liquid helium, 4.2° K.

The literature on heat loss of Dewars indicates that the seepage of heat through the walls can be kept as low as 2 microwatts per cm.$^2$ using present Dewar construction techniques. This is 20 milliwatts per meter$^2$. A line two hundred miles long, i.e., about 300 kilometers, with a circumference of one meter, will have a total surface area of 300,000 square meters, and the heat seepage will, therefore, be 6000 watts. If the temperature is 4.2° K. an ideal Carnot refrigerator will require about $$(290°/4.2°) \times 6000$$

watts input to remove this. A practical refrigerator will require roughly double this input or 830 kw.

Loss through the wires at the end can be reduced to about .042 watt per input lead per ampere. With two leads at each end, each carrying 60,000 amperes, the total loss will be 10,000 watts. It is estimated that if multi-stage cooling of the leads is used, the refrigeration effort needed here will be roughly twenty times this value, or about 200 kw. Thus the total line "losses" will be about 1000 kw. This is about .17% of the 600,000 kw. carried by the line and compares with typical line losses of 4 to 5 percent for new 250 kv. lines being installed today. At a typical generation cost .8 cent per kilowatt hour, this represents a saving of about $200 per hour on a 600 megawatt line for peak load, or perhaps $100 per hour on an average load. This adds up to about one million dollars per year.

While there have been disclosed what are considered to be preferred embodiments of the invention, it will be apparent that many changes and modifications may be made therein without departing from the essential spirit of the invention. It is intended therefore in the appended claims to cover all such changes and modifications as fall within the true scope of the invention.

What is claimed is:

1. A superconductive transformer comprising at least primary and secondary inductively intercoupled windings formed of superconductive material, each of said windings being constituted by a plurality of coil layers, the layers of the two windings being interleaved to provide a minimum flux density magnetic environment for said windings, means so interconnecting the layers of the respective windings to provide a predetermined step ratio therebetween, and means to maintain said windings at a superconductive temperature.

2. A superconductive transformer comprising primary and secondary inductively intercoupled windings formed of superconductive material and being wound about a core, each of said windingst being constituted by a plurality of coil layers, the layers of the two windings being interleaved to provide a minimum flux density magnetic environment for said windings and means so interconnecting the layers of the respective windings to provide a predetermined step ratio therebetween, and means independent of said core to maintain said windings at a superconductive temperature.

3. A superconductive transformer comprising primary and secondary inductively intercoupled windings formed of superconductive material and being wound about a core, each of said windings being constituted by a plurality of coil layers, the layers of the two windings being interleaved, and means so interconnecting the layers of the respective windings to provide a predetermined step ratio therebetween, and means independent of said core to maintain said windings at a superconductive temperature, said last named means including an insulation jacket surrounding said windings and provided with a duct through which extend leads for said windings and a refrigeration system communicating with said jacket through said ducts.

4. A transformer, as set forth in claim 3, wherein said refrigeration system is constituted by a series of stages progressively to lower the temperature of the transformer coils to the desired superconductive value.

5. A superconductive transformer comprising at least primary and secondary inductively intercoupled windings formed of superconductive material, each being constituted by a plurality of concentric cylindrical coils in which the primary and secondary coils are interleaved so as to minimize the production of interacting magnetic fields, means so interconnecting the coils of the respective windings to provide a predetermined step ratio therebetween and means to maintain said windings at a superconductive temperature.

6. A transformer as set forth in claim 5 wherein the coils of one of said windings are serially connected and the coils of the other winding are connected in parallel relationship.

7. A transformer as set forth in claim 5 wherein the coils of one of said windings are connected in series-parallel relationship and the coils of the other winding are connected in series relationship.

8. A superconductive transformer comprising a primary and a secondary winding inductively intercoupled and formed of superconductive material, the windings being wound about a core and being each constituted by a like plurality of concentric cylindrical coils in which the primary and secondary coils are interleaved, said windings being surrounded by an insulation jacket independent of said core and having an outlet duct, means connecting the coils of one of said windings in series-parallel relationship to leads extending through said duct, means connecting the coils of the other winding in series relationship to additional leads extending through said duct, and a refrigeration system operatively coupled to said duct to maintain superconductive temperatures within said jacket.

9. A transformer, as set forth in claim 8, wherein said jacket is constituted by a Dewar vessel in torroidal form through which the core extends.

10. A transformer, as set forth in claim 9, wherein an additional Dewar vessel surrounds the first Dewar vessel.

11. A transformer, as set forth in claim 1, wherein said windings are wound about one leg of a rectangular core and is hermetrically sheathed in a vacuum jacket.

12. A transformer, as set forth in claim 1, wherein said windings are wound on the outer leg of a core of the shell type.

13. A transformer, as set forth in claim 1, wherein said means to maintain the windings at a superconductive temperature include a series of refrigeration stages of progressively greater value.

14. A three-phase superconductive transformer comprising a common core having three legs and primary and secondary windings surrounding each leg, each winding being constituted by a plurality of coil layers in interleaved relationship and so connected as to provide a predetermined step ratio between windings, and means to maintain the windings at a superconductive temperature.

15. A transformer, as set forth in claim 1, wherein each layer is constituted by a spiral of wire forming an annulus, the interleaved annuli being stacked in interleaved relationship on a core.

16. A transformer, as set forth in claim 1, wherein each layer is constituted by a spiral of foil forming an annulus.

References Cited in the file of this patent

UNITED STATES PATENTS

| | | |
|---|---|---|
| 1,334,041 | Lindstrom | Mar. 16, 1920 |
| 1,854,795 | Kaempf | Apr. 19, 1932 |
| 2,002,344 | Fisher et al. | May 21, 1935 |
| 2,341,058 | Paluev | Feb. 8, 1944 |
| 2,440,290 | Pickles | Apr. 27, 1948 |
| 2,521,513 | Gray | Sept. 5, 1950 |
| 2,561,738 | Hill | July 24, 1951 |
| 2,916,615 | Lundburg | Dec. 8, 1959 |
| 2,935,694 | Schmitt et al. | May 3, 1960 |
| 2,944,211 | Richards | July 5, 1960 |
| 2,949,602 | Crowe | Aug. 16, 1960 |
| 2,987,631 | Park | June 6, 1961 |